Sept. 17, 1929.　　　P. P. HORNI　　　1,728,762
TRAFFIC SIGNAL
Filed Dec. 9, 1926　　　2 Sheets-Sheet 1
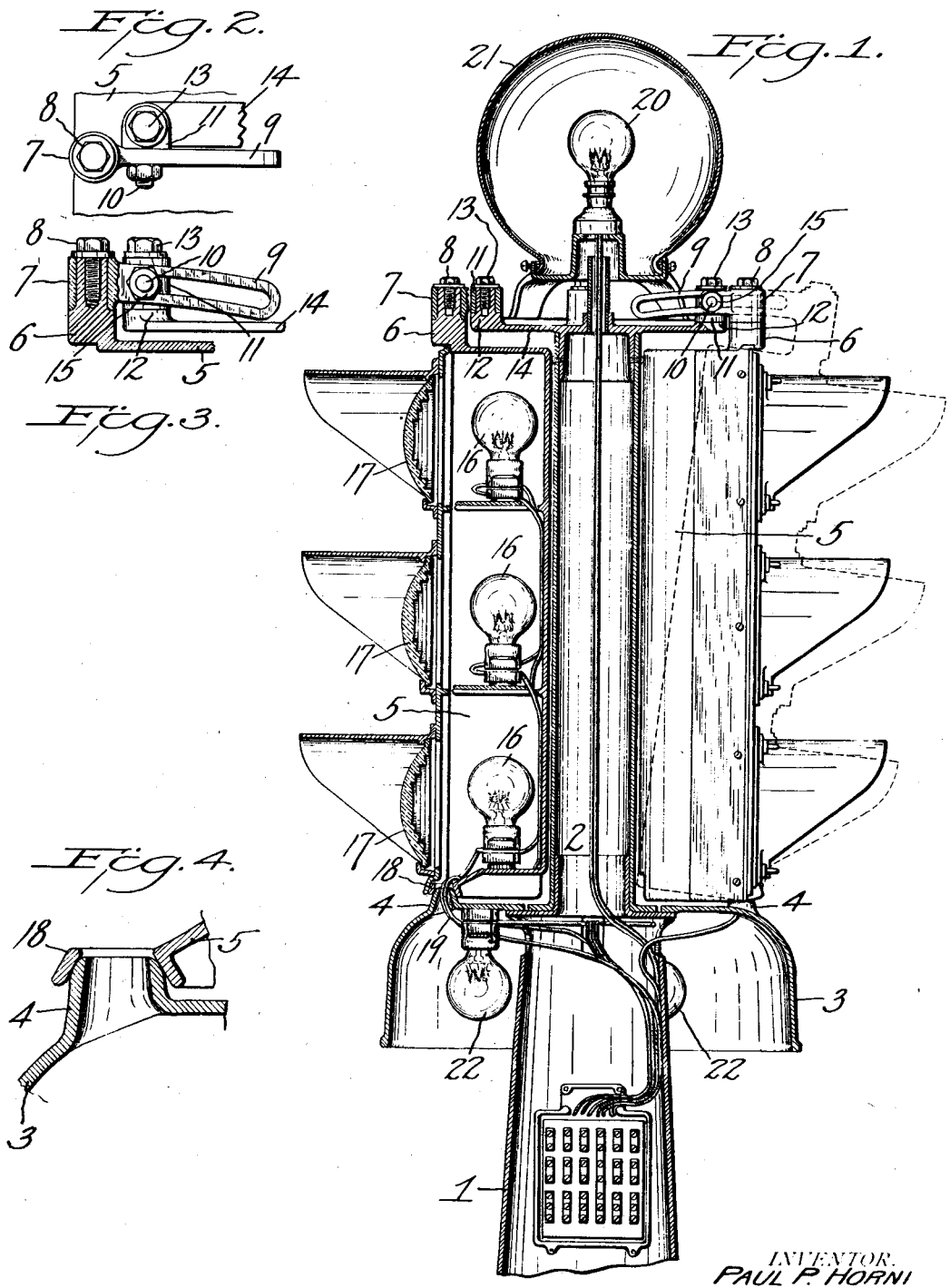

Sept. 17, 1929. P. P. HORNI 1,728,762
TRAFFIC SIGNAL
Filed Dec. 9, 1926 2 Sheets-Sheet 2

INVENTOR.
PAUL P. HORNI
BY
ATTORNEYS.

Patented Sept. 17, 1929

1,728,762

UNITED STATES PATENT OFFICE

PAUL P. HORNI, OF NEWARK, NEW JERSEY

TRAFFIC SIGNAL

Application filed December 9, 1926. Serial No. 153,618.

My invention relates to signal lanterns designed to control vehicular traffic on highways.

A preferred form of traffic signal lanterns, in general use today, comprises two or more lantern units arranged in a vertical column, each lantern unit having a central lamp around which on the four sides of the lantern are placed colored lenses, the lamp occupying the common focus of all the four lenses of its unit. Each unit is therefore adapted to project light signals in four cardinal directions. Two opposite lenses of one unit may, for example, be colored red while the two collateral lenses may be colored green, thus enabling the one lamp to give simultaneously both the "go" signal for one straight-ahead direction and the "stop" signal for the cross traffic. Another unit vertically disposed with reference to the first unit will have the colors of the lenses shifted 90° from those of the first unit and generally a third unit will also be provided that has amber lenses on all four sides of the lantern for giving a clearance interval between changes of traffic. Such lanterns, while possessing the merit of simplicity and cheapness, have been found to fail in practice to meet conditions that are irregular or that require particular accuracy in the focusing of the signal rays. For example, when the lantern is hung at considerable elevation above the road, the light rays issuing therefrom may not strike the road at all, or they may strike it on a side where the roadway is up-grade and miss it altogether on a side where the roadway is down-grade. Similarly when the roadways meet at angles other than 90°, the rays issuing from the lenses may miss entirely one or more of the roads.

The object of the present invention is to provide means for adapting the signal to these varying conditions. The invention comprises a combination of a plurality of vertical lantern housings arranged about a common center, each housing containing in a vertical tier all the lamps and their focusing lenses that comprise the signals for one direction and each of said housings being independently adjustable on a fixed support both around a vertical axis for horizontal adjustment and around a horizontal axis for vertical adjustment so that all the lamps and their focusing lenses having been factory-assembled in any one housing to issue parallel rays may after the lanterns are located, have the lenses so presented that the associated rays will issue from any housing, in such a manner as a group to compensate for any irregularity. The invention further comprises certain novel specific combinations embodied in a particular application of the invention as hereinafter described and claimed.

An embodiment of the invention is illustrated in the accompanying drawing, in which—

Figure 1 is a vertical section of a signal lantern.

Figure 2 is a plan of the lantern adjusting device.

Figure 3 is an elevation of the same details in partial section.

Figure 4 is a sectional view on an enlarged scale of the lower hollow pivot of the lantern.

Figure 5:
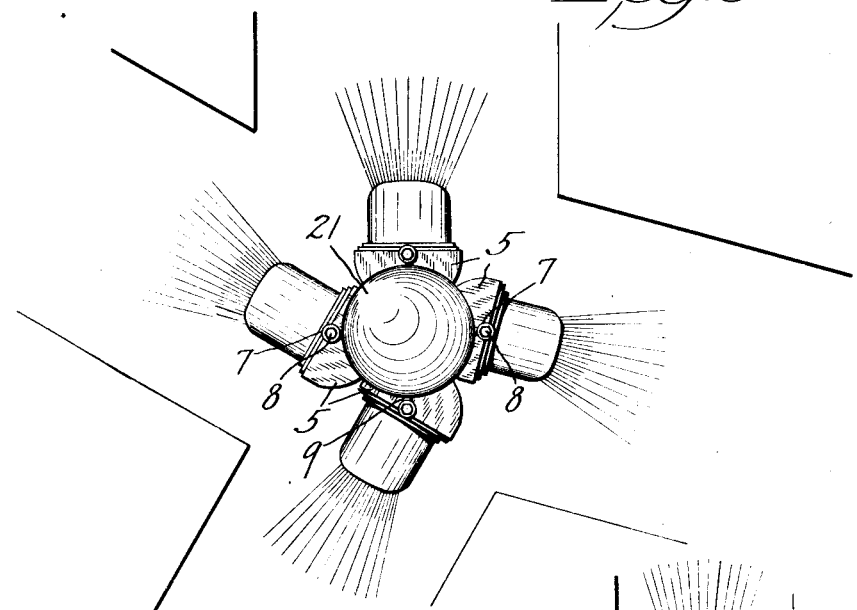
Figures 5, 6 and 7 are plan views showing how the lantern may be applied to crossings having different angularities.
Figure 6:
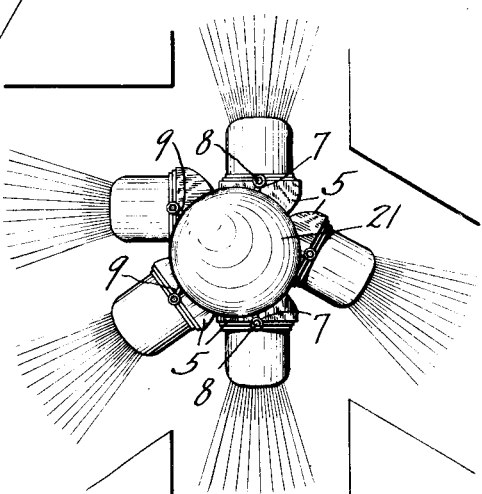
Figure 7:
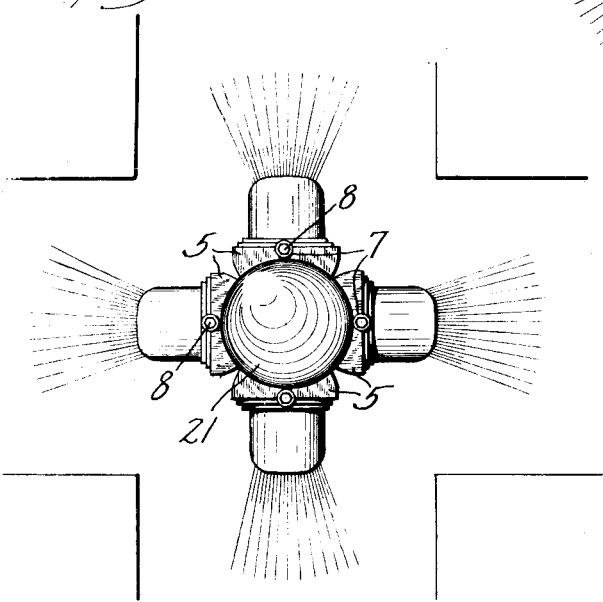

In the drawing, 1 represents a pedestal or post for supporting the lantern. On the top of this pedestal is mounted a lantern support 2 which is preferably made hollow in the form shown. At the base of the lantern support, an inverted bell 3 extends outwardly from the support and at suitable points has hollow trunnions or pivots 4 for forming the pivotal supports for the lamp housings which are shown at 5. Lamp housings 5 have at their upper ends lugs 6 which are pivotally journalled in brackets 7 being held therein by cap screws 8. The brackets 7 have a slotted extension 9 and passing through this slot is the stem of a bolt 10 which extends laterally from a swivel 11 which in turn is journaled on a vertical lug 12, the swivel being held on the lug by cap screw 13. The lugs 12 are part of a top plate 14 secured to the upper end of the lantern support 2. The parts just described form a means of pivoting the upper end of the housings 5 on a vertical axis corresponding to the axis of the pivot 4 and also permitting a certain amount of tipping adjusting around a horizontal axis, the pivot 4 thus acting as a universal joint. The clamping screw 10 has a nut 15. By loosening this nut, the housing 5 can be tipped outwardly, rocking on the pivot 4 until the rays from lamps 16 in the housing passing through lenses 17 in the front of the housing will be concentrated on that part of the roadway where the most direct application of the light is desired. When so adjusted, the nut 15 can be tightened onto the slotted arm 9 to hold the lantern housing 5 permanently in the position of desired inclination. Similarly, by loosening cap screw 8 the lantern housing can be turned as on a vertical or substantially vertical axis until the rays from the lights have the proper horizontal direction when the cap screw 8 upon being tightened clamps the brackets 7 to lugs 6 so as to hold the lantern housing permanently in the desired horizontal deflection. At the base of each lantern housing 5, a hollow trunnion 18 is made to match over the trunnion 4 so as to provide the universal joint necessary for the motions above described and through this hollow trunnion are led the wires 19 that supply electricity to the lamps 16. From this it will be seen that any adjustments of the lantern housing 5 will not interfere with the wiring. The means just described for pivoting the lanterns may be varied in numerous ways. Any well known means for adjusting a frame about a vertical or a horizontal axis may be employed. The lamp 22 in the inverted bell 3 may be used to throw spill light onto the roadway or the lamp support base. A lamp 20 is also mounted at the top of the lantern and enclosed in a globe 21, these elements serving the purpose of an ordinary street lamp. The manner in which the lantern housing can be adjusted to cast the rays of the lamps downward is illustrated in Figure 1 by dotted lines, while in Figures 5, 6 and 7 are shown various positions that the lantern housings may be adjusted to, around their vertical axes to direct their rays along roadways having different angularities. In Figure 6 is illustrated a modification where five housings are mounted on one support to be used where five roadways meet. It will be understood that the number of housings at any location will be varied to suit the requirements.

While I have described a particular embodiment of the invention, I do not wish to be limited to the various mechanical details as described as any other means known to the art may be substituted for those shown and still come within the scope of my claims.

I claim:—

1. A traffic signal comprising in combination, a lantern support, a plurality of lantern housings arranged around said support, each housing containing all the lamps and lenses for the signals of a particular direction arranged therein in a vertical column, each housing being mounted at its lower end on a universal pivotal connection with the support and at its upper end having means for adjusting and holding the housing at different vertical and horizontal angles.

2. A traffic signal comprising in combination, a lantern support, a plurality of lantern housings arranged around said support, each housing containing all the lamps and lenses for the signals of a particular direction arranged therein in a vertical column, each housing being mounted at its lower end on a universal pivotal connection with the support and at its upper end having means for adjusting and holding the housing at different vertical and horizontal angles, the universal pivot being hollow to permit the passage of wires.

3. A traffic signal comprising in combination, a lantern support having a central column with upper and lower horizontal extensions, a plurality of lantern housings arranged around said central column, each of said housings being pivotally supported on a universal joint on one of the said extensions and connected to the other extension by a joint including means providing adjustment of the housing around a vertical axis and outward adjustment with relation to the central column.

PAUL P. HORNI.